United States Patent [19]

Brown

[11] 4,177,558
[45] Dec. 11, 1979

[54] INTERNAL CUTTER FOR TRIMMING PLASTIC PIPE

[75] Inventor: Thomas G. Brown, Erie, Pa.

[73] Assignee: Reed Manufacturing Company, Erie, Pa.

[21] Appl. No.: 883,239

[22] Filed: Mar. 3, 1978

[51] Int. Cl.² .............................................. B23D 21/06
[52] U.S. Cl. ...................................................... 30/103
[58] Field of Search ................. 30/103, 104, 105, 106, 30/107, 108

[56] References Cited

U.S. PATENT DOCUMENTS

| | | | |
|---|---|---|---|
| 936,263 | 10/1909 | Young | 30/103 |
| 3,406,449 | 10/1968 | Doerner | 30/107 |
| 4,033,229 | 7/1977 | Sarnelli | 30/104 |

Primary Examiner—Robert L. Spruill
Assistant Examiner—J. T. Zatarga
Attorney, Agent, or Firm—Ralph Hammar

[57] ABSTRACT

A cutter for trimming plastic pipe which has been roughed in with an end projecting through an opening in a floor so that the trimmed end is in fixed relation, above or below, the surface of the floor. The cutter comprises a housing with its lower end riding on the surface of the floor, an internal saw with its cutting edge in a plane parallel to the surface of the floor received within the pipe end adjacent one side of the pipe and vertically adjustable to establish the level of cutting, and internal guide fingers exerting a thrust on the side of the pipe opposite the saw and adjustable to move the housing sufficiently to force the saw through the wall of the pipe end after which the fingers guide further rotation of the housing about the axis of the pipe end to complete the cut.

3 Claims, 5 Drawing Figures

INTERNAL CUTTER FOR TRIMMING PLASTIC PIPE

Plastic pipe is usually roughed in with its upper end projecting above the surface of the floor or outward from the surface of a wall in this case of wall mounted drains. Before completing the final installation, it is necessary that the upper end be cut off so that its upper edge has a fixed relation slightly above or slightly below the surface of the floor depending upon the fittings which are to be connected. This invention is a cutter for trimming the pipe ends to provide the desired relation of the finished end to the surface of the floor.

In the drawing

Figure 2:
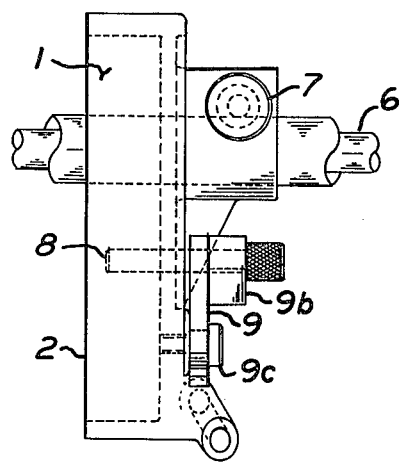
FIG. 2 is a side elevation of FIG. 1.
Figure 1:
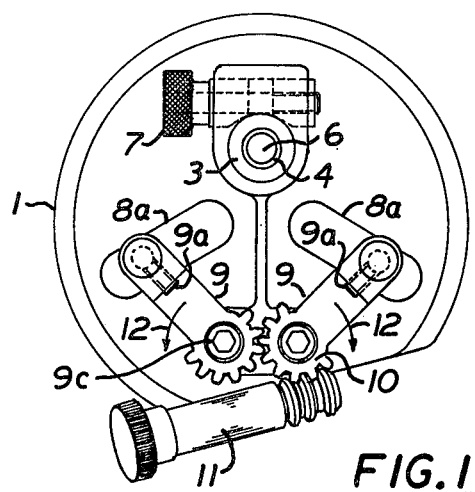
FIG. 1 is a top view of the device.

The device has a hollow housing 1 with a lower rim surface 2 which rides in load carrying relation on the surface of the floor. Any means for supporting the housing in fixed relation to the surface of the floor may be used.

Adjustably supported in the housing 1 is a quill or holder 3 in which is journaled a spindle 4 having its lower end fixed to a saw 5 and its upper end 6 formed to be chucked in a drill. The spindle is journaled on a vertical axis and the cutting edge of the saw is in a horizontal plane. When a clamp nut 7 is loosened the holder for the spindle may be moved vertically with respect to the housing 1 until the saw is at the desired level with relation to the surface of the floor. As soon as the adjustment is made, the clamp nut 7 is tightened and remains in this position until this tool is to be used in a location requiring cut off at a different level.

Figure 4:
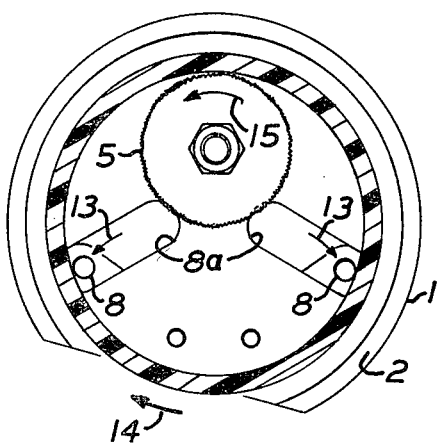
FIG. 4 is a bottom plan view of FIG. 1 showing the parts in position in readiness to force the saw through the wall of the pipe end.
Figure 3:
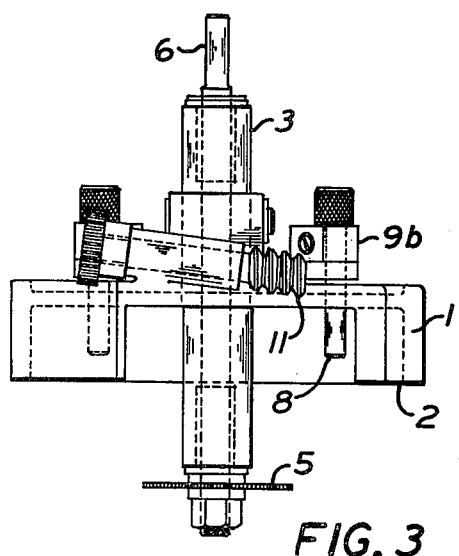
FIG. 3 is an end elevation of FIG. 1.
Figure 5:
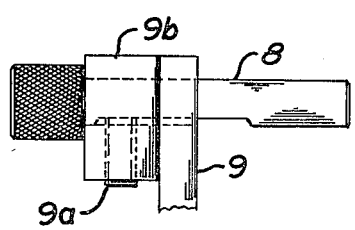
FIG. 5 is a detail showing how the guide fingers may be retracted for use with pipe of smaller size.

When initially mounted on the pipe to be cut off, the saw 5 fits within the pipe at one side, as shown in FIG. 4 and guide pins 8 fit within the pipe at the opposite side of the pipe. This is possible because the guide pins are adjustable and are adjusted so the saw and guide pins form the locus of a circle of diameter smaller than the inner diameter of the pipe end. The guide pins are fixed to arms 9 by set screws 9a in bosses 9b integral with the arms 9. The arms 9 are pivoted on the housing 1 by shoulder screws 9c. Each arm 9 is integral with a gear 10. The gears 10 mesh with each other so that the pins 8 move in unison. A feed screw 11 meshing with one of the gears 10 moves the arms 9 back and forth along slots or guide ways 8a in the top wall of the housing 1. In the positions shown in FIG. 4, there is enough clearance so the saw is not compelled to contact the pipe. The saw is moved toward the pipe when the arms 9 rotate in the direction of arrows 12 thereby causing the pins 8 to move closer to the housing 1 or in the direction of arrows 13 as shown in FIG. 4. The pins 8 when so moved force the housing relative to the pipe upward as viewed in FIG. 4 and thereby force the saw 5 into the pipe.

In use the pins 8 are retracted and the housing is mounted in place over the upper end of the pipe to be cut with the surface 2 of the housing resting on the floor. As first mounted, the housing and pipe will have the general relation shown in FIG. 4. The feed screw 11 is then turned to move the pins 8 radially outward in guide ways 8a toward the housing thereby creating a reaction force on the housing moving the saw against the pipe. As soon as the saw cuts through the pipe, as will be evident from the sound of the saw, the turning of the feed screw 11 is stopped and thereafter, while maintaining the pins 8 in contact with the pipe and the surface 2 of the housing in contact with the surface of the floor, the housing is rotated around the pipe on the direction of arrow 14, a direction opposite the rotation of the saw indicated by the arrow 15.

The foregoing parts are useful for cutting larger size pipe for example in the range of 2 to 4 inches in diameter. For 1¼ inch and 1½ inch pipe, the guide pins 8 are retracted by loosening the set screws 9a and tightening the set screws when the pins have reached the retracted position. The saw may be changed to a appropriate size, for example 1¼ inch in diameter. When the saw is changed, the position of the saw relative to the surface of the floor may be adjusted, if necessary. To cut off the pipe the housing 1 is merely lowered over the upper end of the pipe to be cut with the saw outside the pipe and the housing is them moved until the saw makes contact with the pipe and is then moved around the pipe as necessary until the pipe is completely cut through. By using these two modes of operation the range of the cutter is extended to smaller sizes so that one size tool can handle, for example, all pipe sizes up to 4 inches.

The use of the tool for trimming pipe projecting through a wall is obvious from the description of trimming pipe projecting through a floor.

What is claimed is:

1. A cutter for trimming roughed in plastic pipe to a predetermined level relative to the surface of a floor or wall through which the pipe extends, comprising a housing surrounding the pipe to be trimmed, means riding in load carrying relation to said surface for supporting the housing for movement over said surface and for rotation around said pipe, a circular saw jounaled in the housing on an axis perpendicular to said surface, said saw being vertically adjustable along said axis to select the level of the saw relative to said surface, guide members forming with the saw the locus of a circle, means for retracting said guide members radially inward toward the saw to reduce the diameter of said circle so the saw and guide members may be telescoped within said pipe and means for extending said guide members radially outward away from the saw to increase the diameter of said circle and force the saw through said pipe, said guide members riding on the internal surface of said pipe and guiding the saw as the housing while supported on said surface by its supporting means is rotated about said pipe to cut off the projecting end of said pipe.

2. The structure of claim 1 in which the saw is fixed to a spindle journaled in a holder and the holder is vertically adjustable in the housing.

3. The structure of claim 2 in which the end of the spindle remote from the saw is designed to be chucked in a drill.

* * * * *